United States Patent
Sugitani

(10) Patent No.: US 6,513,333 B2
(45) Date of Patent: Feb. 4, 2003

(54) SURGE DETECTION SYSTEM OF GAS TURBINE AEROENGINE

(75) Inventor: Yukinobu Sugitani, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 09/862,341

(22) Filed: May 23, 2001

(65) Prior Publication Data

US 2001/0045088 A1 Nov. 29, 2001

(30) Foreign Application Priority Data

May 25, 2000 (JP) .................................. 2000-154444

(51) Int. Cl.⁷ .................................................. F02C 9/52
(52) U.S. Cl. ............................ 60/773; 60/39.27; 60/795
(58) Field of Search ........................... 60/39.27, 39.281, 60/773, 803, 794, 795; 415/17, 27, 47

(56) References Cited

U.S. PATENT DOCUMENTS

| | | | |
|---|---|---|---|
| 4,060,979 A | * 12/1977 | Elsaesser et al. | .......... 60/39.27 |
| 4,581,888 A | 4/1986 | Schmitzer et al. | |
| 4,603,546 A | 8/1986 | Collins | |
| 4,655,034 A | * 4/1987 | Kenison et al. | ................ 60/795 |
| 5,235,801 A | * 8/1993 | Evenson et al. | ............... 60/795 |
| 5,726,891 A | * 3/1998 | Sisson et al. | .............. 60/39.27 |
| 5,752,379 A | * 5/1998 | Schafer et al. | ................ 60/794 |

FOREIGN PATENT DOCUMENTS

| | | |
|---|---|---|
| JP | 58-57098 | 4/1983 |
| JP | 59-7738 | 1/1984 |

* cited by examiner

*Primary Examiner*—Louis J. Casaregola
(74) *Attorney, Agent, or Firm*—Arent Fox Kintner Plotkin & Kahn, PLLC

(57) ABSTRACT

A surge detection system for detecting a surge occurred at a compressor of a gas turbine aeroengine having a turbine connected to the compressor. In the system, the ratio between the compressor outlet pressure and its differential and the differential of the turbine inlet temperature (or the ratio between the turbine inlet temperature and its differential) are calculated. Then, the calculated value are multiplied together and the product is compared with a threshold value. When the product is less than the threshold value, it is determined that a surge occurred at the compressor. With this, a surge occurred at the compressor and a magnitude or degree of the surge occurred may be accurately detected.

20 Claims, 10 Drawing Sheets

SURGE DETECTION SYSTEM OF GAS TURBINE AEROENGINE

BACKGROUND OF THE INVENTION

1. Field of the Invention

This invention relates to a surge detection system of a gas turbine aeroengine, more specifically to a system for detecting a surge occurred at a compressor of a gas turbine aeroengine.

2. Description of the Related Art

In gas turbine aeroengines, if the combustion gas temperature rises sharply because, for example, an increased amount of fuel flow at acceleration is excessive relative to the air flow amount, a compressor rotor blade or blades may sometimes stall. When the stall is serious, the stator vane(s) may also stall and the stall condition may be transmitted to adjacent blades one after another, resulting in a surge.

It should be noted that "surge" and "stall" are used in the following to indicate the same meaning. In other words, a stall occurred at a compressor blade or at a limited group thereof and a surge caused by extensive blade stalling will generally be called "surge"

Since a severe surge may propagate an airframe vibration and may sometimes damage blades, various surge detection techniques have hitherto been proposed.

For example, Japanese Laid-Open Patent Application No. Sho 58(1983)-57098 teaches detecting the occurrence of surge if the absolute value of change of the compressor outlet pressure with respect to time (the absolute value of the differential of the compressor outlet pressure) is greater than a threshold value.

U.S. Pat. No. 4,603,546 proposes detecting the occurrence of surge if the ratio between the compressor outlet pressure and the change thereof with respect to time (the differential thereof) is less than a threshold value.

Japanese Laid-Open Patent Application No. Sho 59(1984)-7738 discloses detecting the occurrence of surge when the ratio between the high-pressure turbine speed and the turbine inlet temperature (gas temperature downstream of the combustion chamber) is less than a threshold value.

U.S. Pat. No. 4,581,888 discloses detecting the surge when the ratio between the high-pressure turbine speed (corrected) and the ratio between the compressor outlet pressure and the fan inlet pressure is greater than a threshold value.

Thus, four kinds of surge detection techniques have been proposed. However, since these four kinds of techniques can not distinguish the surge from engine deceleration, additional determination action of whether the engine is accelerating is needed. Moreover, these methods can not distinguish the surge from misfiring under acceleration.

The drawbacks in these prior art techniques will be explained in detail with reference to the drawings.

As regards the technique taught by Japanese Laid-Open Patent Application No. Sho 58(1983)-57098, as shown in FIG. 7A, it uses the absolute value of the differential of the compressor outlet pressure (illustrated as P3dot in the figure) as a surge detection parameter. Since this parameter fluctuates greatly even under normal condition, this technique can not discriminate the surge from the normal (non-surge) condition. Moreover, as shown in FIG. 7B, it may erroneously detect misfiring or deceleration as a surge.

It should be noted here that FIGS. 7A and 7B are simulation test data. FIG. 7A shows conditions including no surge (normal condition), a slight surge and a serious (large) surge, while FIG. 7B shows conditions including a slight surge, a serious surge, a deceleration and a misfiring. In FIGS. 7A and 7B, the abscissas indicate time [sec.]. These will be the same in the other figures.

As regards the technique proposed in U.S. Pat. No. 4,603,546, as shown in FIG. 8A, it uses the ratio between the compressor outlet pressure (illustrated as P3) and the differential of the compressor outlet pressure (illustrated as P3dot). This configuration can improve the accuracy of distinction between the normal condition and the surge condition.

Although the measurement fluctuation under normal conditions becomes less than that by the technique illustrated in FIG. 7A, it is still large. Thus, to use only a parameter relating to the compressor outlet pressure for surge detection will inevitably lead erroneous results. Moreover, as shown in FIG. 8A, this technique may erroneously detect the misfiring or deceleration as a surge.

As regards the technique mentioned in Japanese Laid-Open Patent Application No. Sho 59(1984)-7738, as illustrated in FIG. 9A, since this uses the ratio between the high-pressure turbine speed (shown as "N2") and the turbine inlet temperature (gas temperature downstream of the combustion chamber; shown as "T45"), this method can not detect a slight surge accompanying no turbine inlet temperature change. Moreover, this method needs a relative long time to detect a serious surge with turbine inlet temperature change. In addition, as shown in FIG. 9B, this method may erroneously detect misfiring as a surge.

As regards the technique disclosed in US Patent No. 4,581,888, as illustrated in FIG. 10A, this uses the ratio between the corrected value of the high-pressure turbine speed (shown as "N2"), and the ratio between the compressor outlet pressure P3 and the fan inlet pressure (shown as "P1"). Since difference in these parameters between the normal condition and the surge condition is small, the technique is not satisfactory in detection accuracy. And, as shown in FIG. 10B, it may also erroneously detect misfiring as a surge.

SUMMARY OF THE INVENTION

A first object of this invention is therefore to overcome the problems of the prior art techniques by providing a surge detection system of a gas turbine aeroengine that can accurately detect a surge occurred at the compressor and even a magnitude or degree of the surge occurred, without need for engine acceleration detection.

A second object of this invention is therefore to overcome the problems of the prior art techniques by providing a surge detection system of a gas turbine aeroengine that can accurately detect a surge occurred at the compressor and can conduct a corrective control to suppress the surge if occurred.

For realizing these object, the present invention provides a system for detecting a surge occurred at a compressor of a gas turbine aeroengine having a turbine connected to the compressor, comprising: compressor outlet pressure detecting means for detecting an outlet pressure of the compressor; turbine inlet temperature detecting means for detecting an inlet temperature of the turbine; compressor outlet pressure change parameter determining means for determining a first parameter indicative of change of the compressor outlet pressure based on at least the detected compressor outlet pressure; turbine inlet temperature change parameter determining means for determining a second parameter indicative of change of the turbine inlet temperature based on at least the detected turbine inlet temperature; surge detection parameter determining means for determining a third parameter for surge detection based on the determined first and second parameters; parameter comparing means for comparing the third parameter with a threshold value; and surge detecting means for detecting the surge occurred at the compressor based on a result of the comparison.

BRIEF DESCRIPTION OF THE DRAWINGS

The above and other objects and advantages of the invention will be made more apparent by reference to the following description and drawings, in which.

DETAILED DESCRIPTION OF THE PREFERRED EMBODIMENTS

A surge detection system of a gas turbine aeroengine according to a first embodiment of this invention will now be explained with reference to the drawings.

Figure 1:
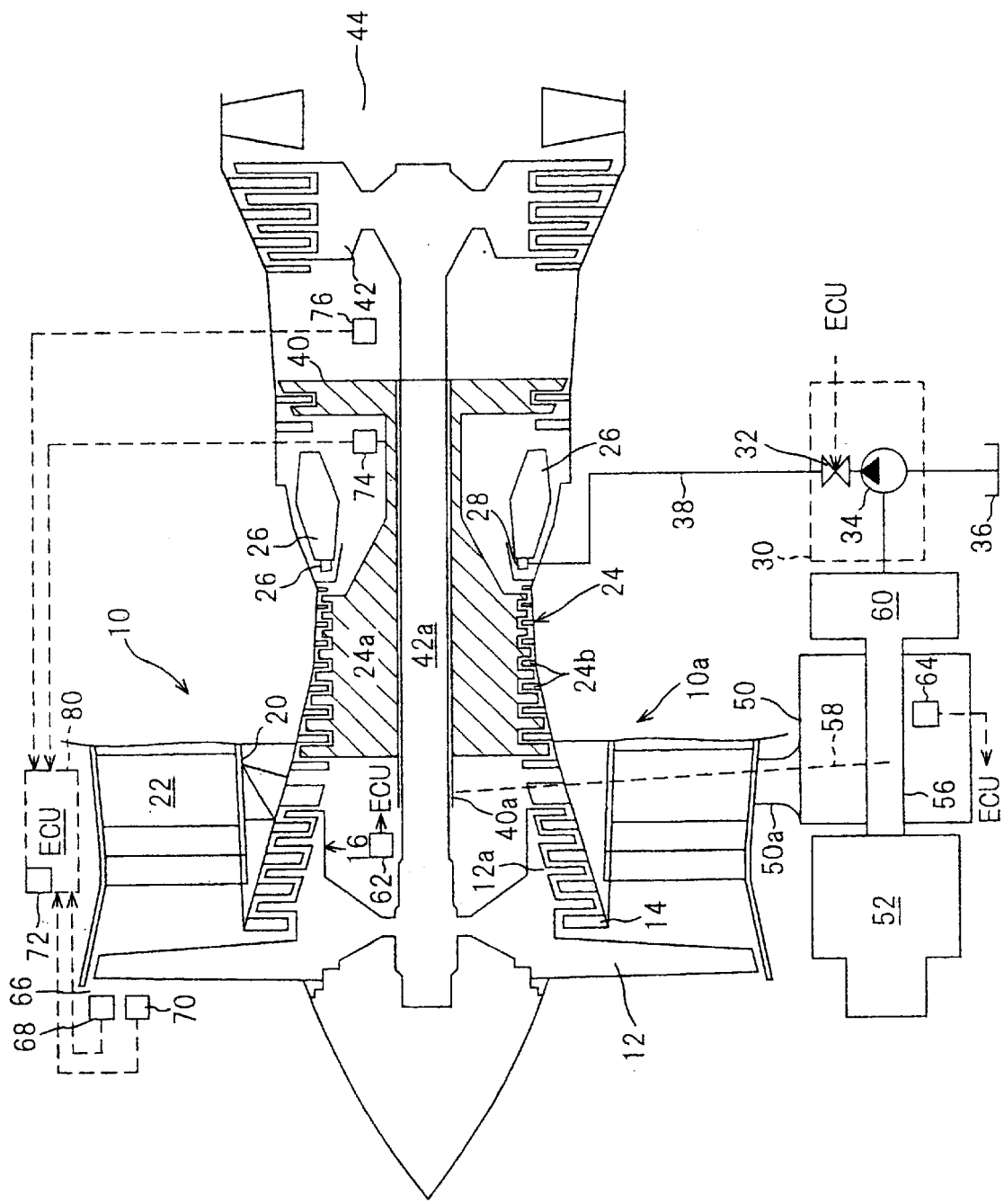
FIG. 1 is an overall schematic view of a surge detection system of a gas turbine aeroengine according to a first embodiment of this invention.

FIG. 1 is an overall schematic view of the surge detection system a gas turbine aeroengine according to a first embodiment of this invention.

The four types of gas turbine engines ordinarily used in aircraft are the turbojet engine, turbofan engine, turboprop engine and turboshaft engine. A two-spool (shaft turbofan) engine will be taken as an example in the following explanation.

In FIG. 1, reference symbol 10 designates a turbofan engine and 10a its main engine unit. The engine 10 is mounted at an appropriate location on an airframe (not shown).

The engine 10 is equipped with a fan (rotor blades) 12 that sucks in air while rotating rapidly. A rotor 12a is formed integrally with the fan 12. The rotor 12a and a stator (stator vanes) 14 facing it, together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The force of the air accelerated rearward by the fan is balanced by a force of reaction that acts on the aircraft as a propulsive force or thrust. Much of the propulsion is produced by the air flow from the fan. The air compressed by the low-pressure compressor 16 flows rearward to a high-pressure compressor 24 where it is further compressed by a rotor (rotor blades) 24a and a stator (stator vanes) 24b and then flows to a combustion chamber 26.

The combustion chamber 26 is equipped with fuel nozzles 28 that pressurize fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air exiting the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion flows to a highpressure turbine 40 and rotates the high-pressure turbine 40 at high speed. The high-pressure turbine 40, more specifically its rotor, is connected to the rotor 24a of the high-pressure compressor 24 by a high-pressure turbine shaft 40a. The rotor 24a is therefore also rotated.

After driving the high-pressure turbine 40, the hot high-pressure gas is sent to a low-pressure turbine 42, which it rotates at relatively low speed. The low-pressure turbine 42, more precisely its rotor, is connected to the rotor 12a of the low-pressure compressor 16 through a low-pressure turbine shaft 42a. The rotor 12a and the fan 12 are therefore also rotated. The high-pressure turbine shaft 40a and the low-pressure turbine shaft 42a are provided in a dual coaxial structure.

The hot high-pressure gas passing through the low-pressure turbine 42 (the turbine exhaust gas) is mixed with the air stream passing through the duct 22 without compression or combustion and the combined flow is jetted rearward of the engine through a jet nozzle 44.

An accessory drive gearbox (hereinafter referred to as "gearbox") 50 is attached through a stay 50a to the undersurface at the front end of the main engine unit 10a. An integrated starter/generator (hereinafter called "starter") 52 is attached to the front of the gearbox 50. The FCU 30 is located at the rear of the gearbox 50.

The engine 10 is started by operating the starter 52 to rotate a shaft 56. The rotation is transmitted to the high-pressure turbine shaft 40a through a drive shaft 58 (and an unshown gear mechanism including a bevel gear etc.) so as to pull in air needed for combustion.

The rotation of the shaft 56 is also transmitted to a PMA (Permanent Magnet Alternator) 60 and the fuel pump 34. The fuel pump 34 is therefore driven to spray fuel from the fuel nozzles 28 as explained above. The resulting air-fuel mixture is ignited to start combustion.

When the engine 10 reaches self-sustaining speed, the rotation of the high-pressure turbine shaft 40a is transmitted back through the drive shaft 58 to drive the fuel pump 34 and also drive the PMA 60 and the starter 52. The PMA 60 therefore generates electricity and the starter 52 supplies power to equipment in and on the airframe (not shown).

An N1 sensor (speed sensor) 62 installed near the low-pressure turbine shaft 42a of the engine 10 outputs a signal proportional to the rotational speed of the low-pressure turbine 42 (speed of the low-pressure turbine shaft 42a). An N2 sensor (speed sensor) 64 installed near the shaft 56 outputs a signal proportional to the rotational speed of the high-pressure turbine 40 (speed of the high-pressure turbine shaft 40a).

A T1 sensor (temperature sensor) 68 and a P1 sensor (pressure sensor) 70 installed near an air intake 66 at the front of the main engine unit 10a output signals proportional to the temperature T1 and the pressure P1 of the inflowing air at that location. A P0 sensor (pressure sensor) 72 installed inside an ECU (Electronic Control Unit), explained below, outputs a signal proportional to atmospheric pressure P0 exerting on the engine 10.

A P3 sensor (pressure sensor) 74 installed downstream of the rotor 24a outputs a signal proportional to the output pressure P3 of the high-pressure compressor 24. A T45 sensor (temperature sensor) 76 installed at an appropriate location between the high-pressure turbine 40 and the low-pressure turbine 42 outputs a signal proportional to the turbine inlet temperature (more precisely, the low-pressure turbine inlet temperature) or the combustion chamber outlet gas temperature (the temperature at a location downstream of the combustion chamber 26).

The aforementioned ECU (designated by reference numeral 80) is incorporated at an upper end position of the main engine unit 10a. The outputs of the sensors mentioned above are sent to the ECU 80.

Based on these input data and other input data sent from various sensors (not shown), the ECU 80 calculates a command value Wf (control input or manipulated variable) for supplying fuel to the engine 10 at the flow rate needed to cause the difference between the low-pressure turbine shaft speed (low-pressure turbine speed) N1 and a desired speed N1com determined in response to the throttle lever position (pilot desired output; not shown in the figure) to decrease. The command value Wf is sent to the FCU 30.

Further, the ECU 80 monitors whether or not the detected values of the low-pressure turbine speed N1 and the high-pressure turbine speed N2 exceed corresponding limit values. When either of the detected low-pressure turbine speed N1 and high-pressure turbine speed N2 exceeds the limit value, the ECU 80 makes an overspeed determination and determines the command value Wf such that the fuel flow rate to the engine 10 is decreased to a prescribed value, specifically to zero or a minimum value.

Furthermore, the ECU 80 determines the command value Wf at the flow rate needed to decrease the difference between the change of the high-pressure turbine shaft speed (high-pressure turbine speed) N2 (i.e., N2's differential N2dot) and a desired acceleration/deceleration N2dotcom, and send the same to the FCU 30. Based on these command values Wf, the FCU 30 meters fuel through the fuel metering valve 32 and supplies the metered fuel to the combustion chamber 26

Furthermore, the ECU 80 detects a surge occurred at the low-pressure compressor 16 and the high-pressure compressor 24, in particular that occurred at the high-pressure compressor 24, and conducts a corrective control to allow the compressor to recover from the surge.

The surge detection and corrective control that are the operation of the surge detection system of a gas turbine aeroengine according to this embodiment will be explained.

Figure 2:
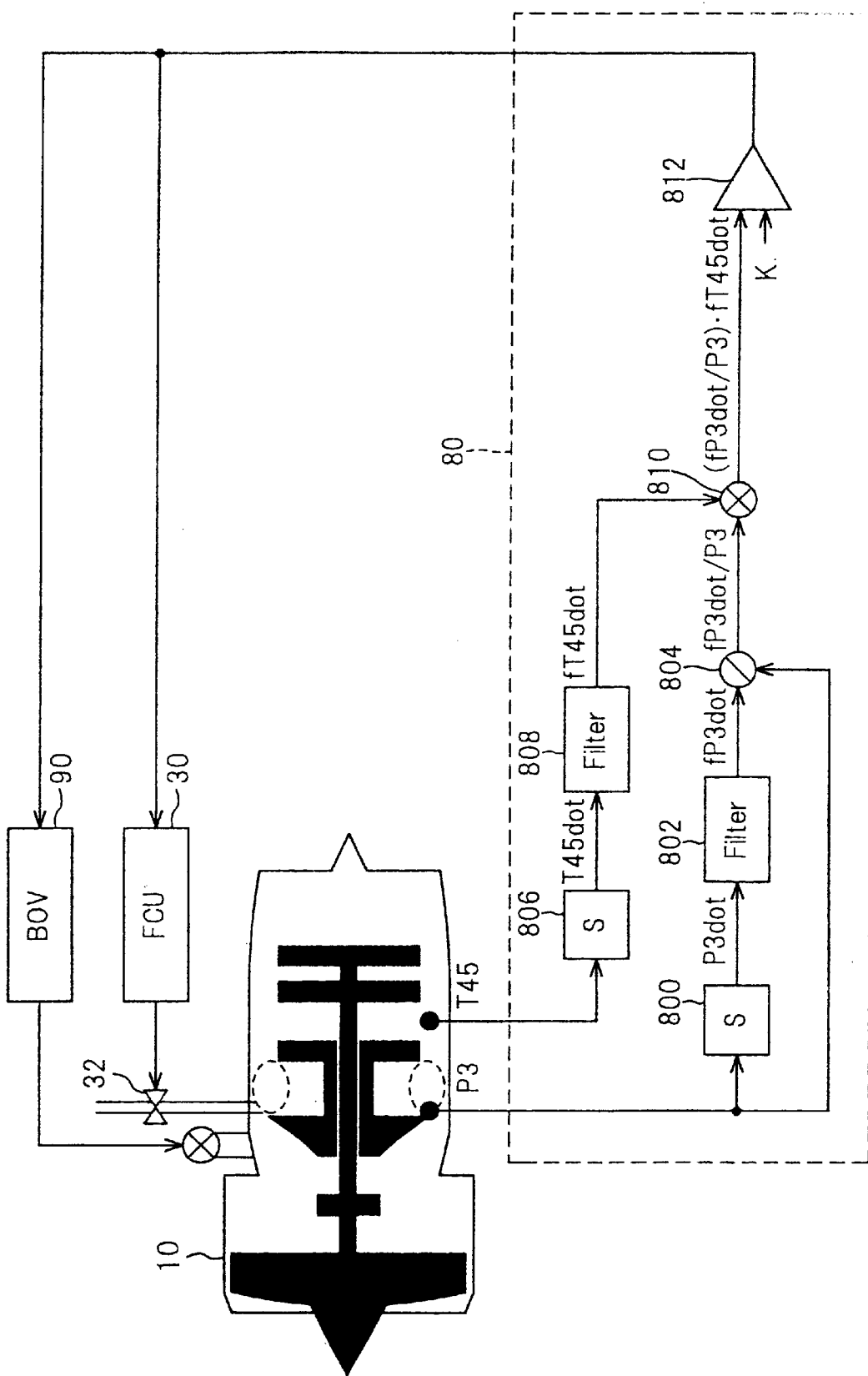
FIG. 2 is a block diagram showing the surge detection operation of an ECU in the system illustrated in FIG. 1.

FIG. 2 is a block diagram showing the surge detection operation and the corrective control operation conducted in the ECU 80. The operation is repeatedly processed at a cycle of 10 msec.

As illustrated, from among the parameters indicating engine operation mentioned above, two parameters, i.e., the high-pressure compressor outlet pressure P3 and the low-pressure turbine inlet temperature (gas temperature at downstream of the combustion chamber 26) T45 are used in the system according to this embodiment.

Explaining the above with reference to FIG. 2, the high-pressure compressor outlet pressure P3 is inputted to a derivative calculation block (shown as "S" in the figure) 800 at every cycle, where the derivative (differential) P3dot (more generally, change of the compressor outlet temperature with respect to time) is calculated based on the input.

The calculated value P3dot is then inputted to a low-pass filter (shown as "Filter") 802 where it is filtered and a high-frequency component in the input is removed. The filtered value is named "fP3dot". The characteristic or factor of the low-pass filter 802 is as follows:

$$fP3dot(k)=0.1518 \times fP3dot(k-1)+0.8482 \times P3dot(k-1)$$

In the above, (k) and (k−1) are sampling numbers in the discrete-data system, more specifically the value at the current cycle and that at the last (preceding) cycle.

The values fP3dot and the high-pressure compressor outlet pressure P3 are then inputted to a divider 804 where a division is made to determine the ratio therebetween, i.e., fP3dot/P3dot (more generally, a (first) parameter indicative of change of the compressor outlet pressure) is calculated.

On the other hand, the low-pressure turbine inlet temperature T45 is inputted to another derivative calculation block (shown as "S") 806 at each cycle, where the low-pressure turbine inlet temperature derivative (differential) T45dot (more generally, change of the turbine inlet temperature with respect to time) is calculated.

The calculated value T45dot is then inputted to a low-pass filter (shown as "Filter") 808 where it is filtered and high-frequency component in the input is removed. The filtered value is named "fT45dot" more generally, a (second) parameter indicative of change of the turbine inlet temperature).

The characteristic or factor of the low-pass filter 808 is as follows:

$$fT45dot(k)=0.7304 \times fT45dot(k-1)+0.2696 \times T45dot(k-1)$$

The values fP3dot/P3 and fT45dot are then input to a multiplier 810 where the product thereof, i.e., (fP3dot/P3)×fT45dot is calculated. The product generally indicates a (third) parameter for surge detection.

The calculated product is then inputted to a comparator 812 where the input ((fP3dot/P3)×fT45dot) is compared with a predetermined threshold value K (more precisely, −65).

When the input is less than the threshold value K, the comparator 812 outputs a signal indicating that a surge has occurred at the high-pressure compressor 24.

Figure 3A:
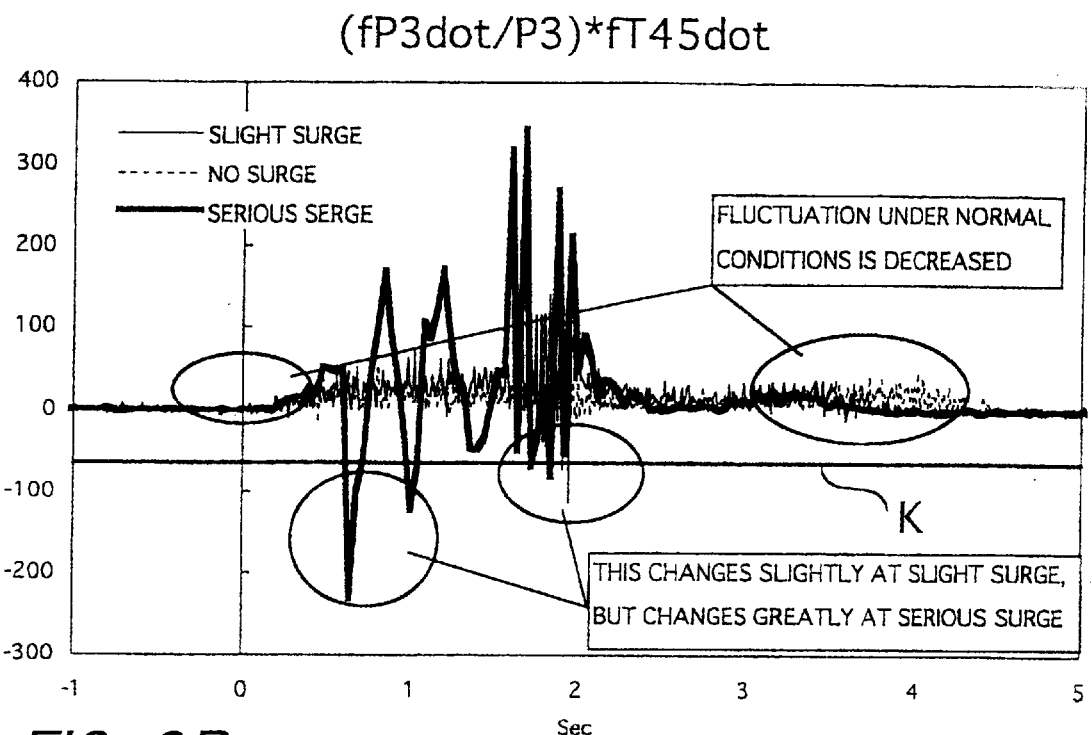
FIGS. 3A and 3B are a set of simulation test data illustrating the results of surge detection operation of the configuration illustrated in FIG. 2.
Figure 3B:
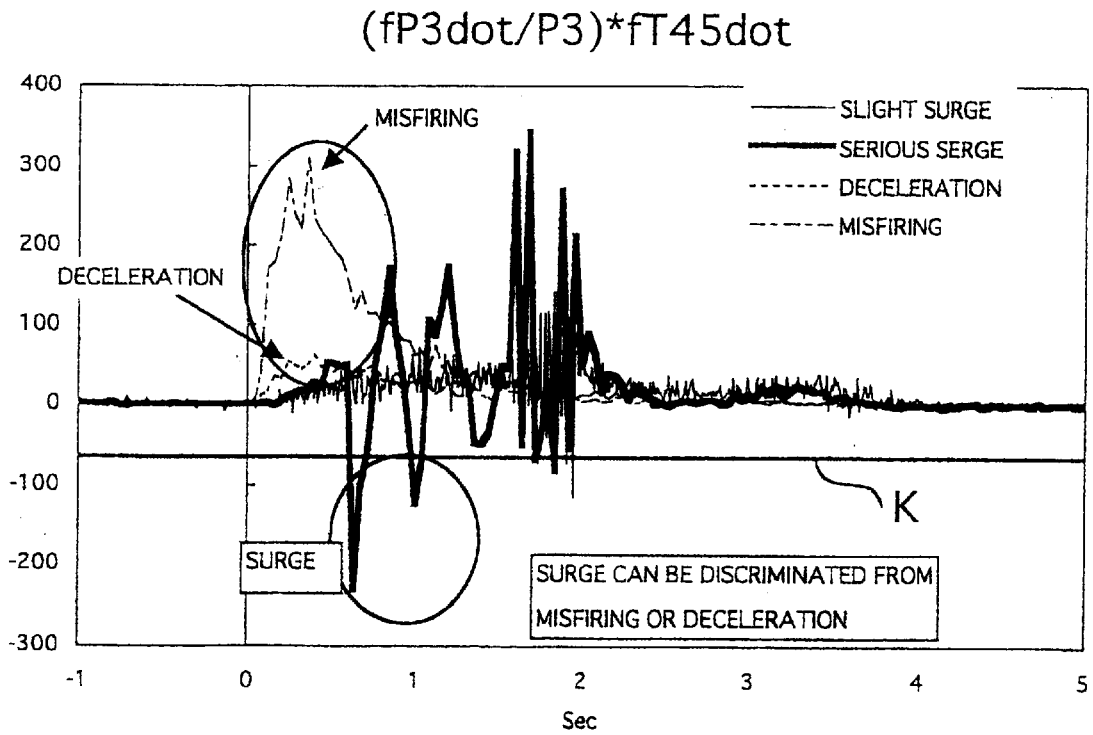

FIGS. 3A and 3B are a set of simulation test data illustrating the results of surge detection operation of the configuration illustrated in FIG. 2.

As will be understood from FIG. 3A, the characteristic feature of the surge detection system according to this embodiment is that, by using the product ((fp3dot/P3)× fT45dot) as the parameter for surge detection, the system can decrease the parameter fluctuation in the normal area (where no surge occurs). In other words, this system can enlarge the parameter fluctuation at the surge condition.

This surge detection parameter, thus determined, can be surely below the threshold value K. More specifically, the parameter is such that it falls slightly below K when a slight surge occurs, while it falls greatly below K when a severe (large) surge occurs. With this arrangement, the system can accurately detect a surge occurred at the high-pressure compressor 24 and can even detect a magnitude or degree of the surge occurred based on the degree to which the parameter falls below the threshold value K.

Moreover, as shown in FIG. 3B, the parameter changes to fall below K under the surge condition, but changes to be above K (i.e. in the positive direction) such that wave forms are figured in the positive direction (above K) when misfiring or deceleration occurs. Thus, the system makes it possible to accurately discriminate the surge condition from the misfire or deceleration, thereby rendering it unnecessary to additionally detect the engine acceleration. Moreover, the system makes it possible to discriminate the surge condition from misfiring under engine acceleration.

This improvement can be understood from the nature or property of the two parameters of the (high-pressure) compressor outlet pressure P3 and the (low-pressure) turbine inlet temperature T45.

More specifically, as can be seen from FIGS. 7 to 10 illustrating the prior art surge detection techniques, the compressor outlet pressure P3 changes sharply both under the normal condition and the surge condition. This makes it difficult to discriminate between the normal condition and the surge condition, when the parameter P3 is used as the surge detection parameter.

Figure 4A:
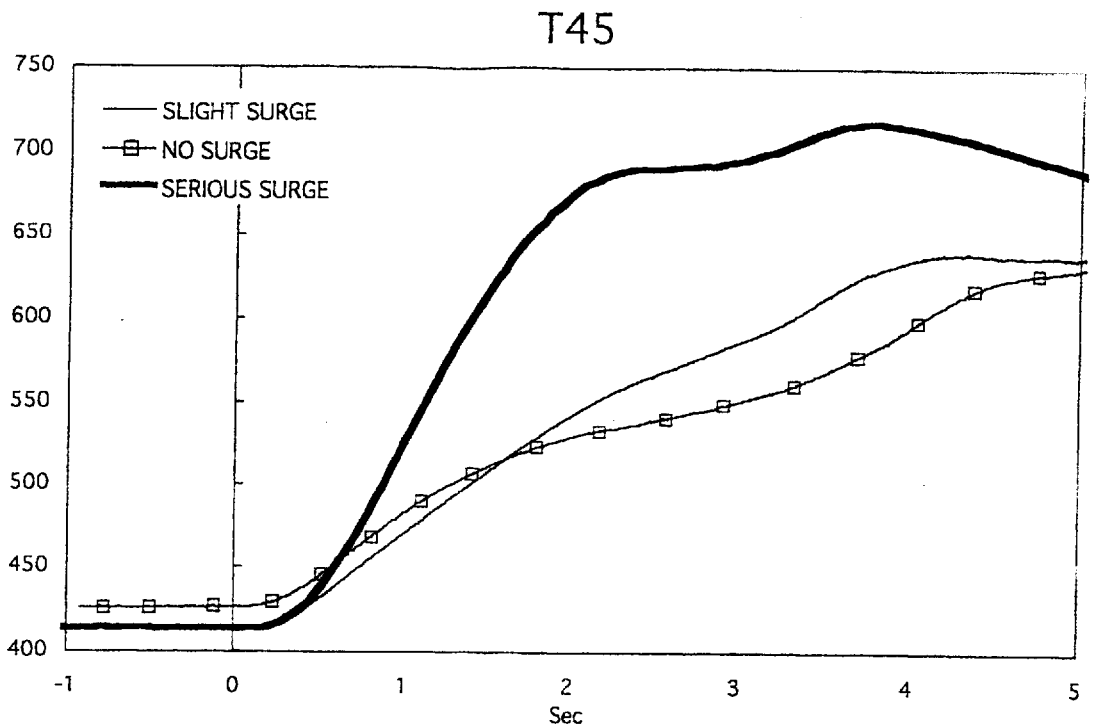
FIGS. 4A and 4B are a set of simulation test data illustrating characteristics of the turbine inlet temperature and change thereof with respect to time of the gas turbine aeroengine illustrated in FIG. 1.
Figure 4B:
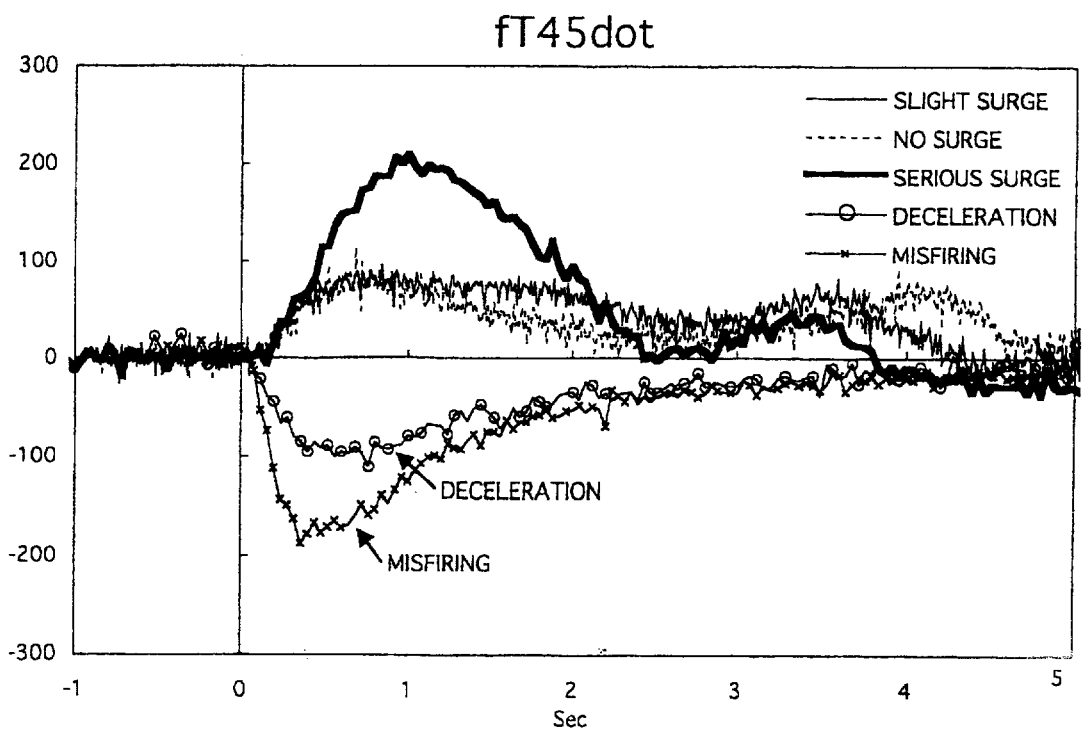

The behavior of the other parameter (the turbine inlet temperature T45) contrasts thereto. As will be understood from FIGS. 4A and 4B, the change of the turbine inlet temperature T45 changes slower with respect to time, requiring a relatively long time to detect the surge after it has occurred. This makes it impossible to detect a slight surge when T45 is used as the surge detection parameter.

The inventor perceived this and found it possible to detect the surge condition accurately, if the (high-pressure) compressor outlet pressure P3 whose behavior is sensitive to surge and the (low-pressure) turbine temperature T45 whose behavior is slow relative to time are used as the surge detection parameter in combination.

Returning to the explanation of FIG. 2, when the ECU 80 detects the occurrence of surge, it conducts the corrective control to allow the engine 10 to recover from the surge.

Specifically, since the surge at the high-pressure compressor 24 normally occurs under engine acceleration, the ECU 80 conducts a fuel metering control. More specifically, the ECU 80 determines the command value Wf such that the FCU 30 decreases the fuel flow rate to be delivered to the engine 10 through the fuel metering valve 32.

Moreover, parallel with or instead of the fuel metering control mentioned above, the ECU 80 conducts a bleed-off control, depending on the magnitude or degree of the surge detected, to open a bleed-off valve (BOV) 90 in order to bleed air from the high-pressure compressor 24 such that the pressure in the compressor 24 drops.

Having been configured in the foregoing manner, the system according to this embodiment can accurately detect a surge occurred at the high-pressure compressor and even the magnitude or degree of the surge occurred, without need to additionally detect engine acceleration.

Further, since the system is configured to conduct the corrective control to allow the engine 10 to recover from the surge, it can promptly prevent the surge, once occurred, from developing further and extensively. To be more specific, it can detect a surge occurred at a blade or a limited group of blades and can prevent it from transmitting or developing to the adjacent blades.

Furthermore, since the system is configured to use the differentials (derivatives) of both the high-pressure compressor outlet pressure P3 and the low-pressure turbine inlet temperature T45, it needs no correction for adjustment based on the engine inlet condition, which would otherwise be necessary if raw values (not differentiated) were used.

Furthermore, in addition to the advantage that no acceleration information is needed, the product of the high-pressure compressor outlet pressure P3 and the low-pressure turbine temperature T45 is calculated and used the same as the (third) parameter for surge detection, hence the system is simple in configuration.

Figure 5:
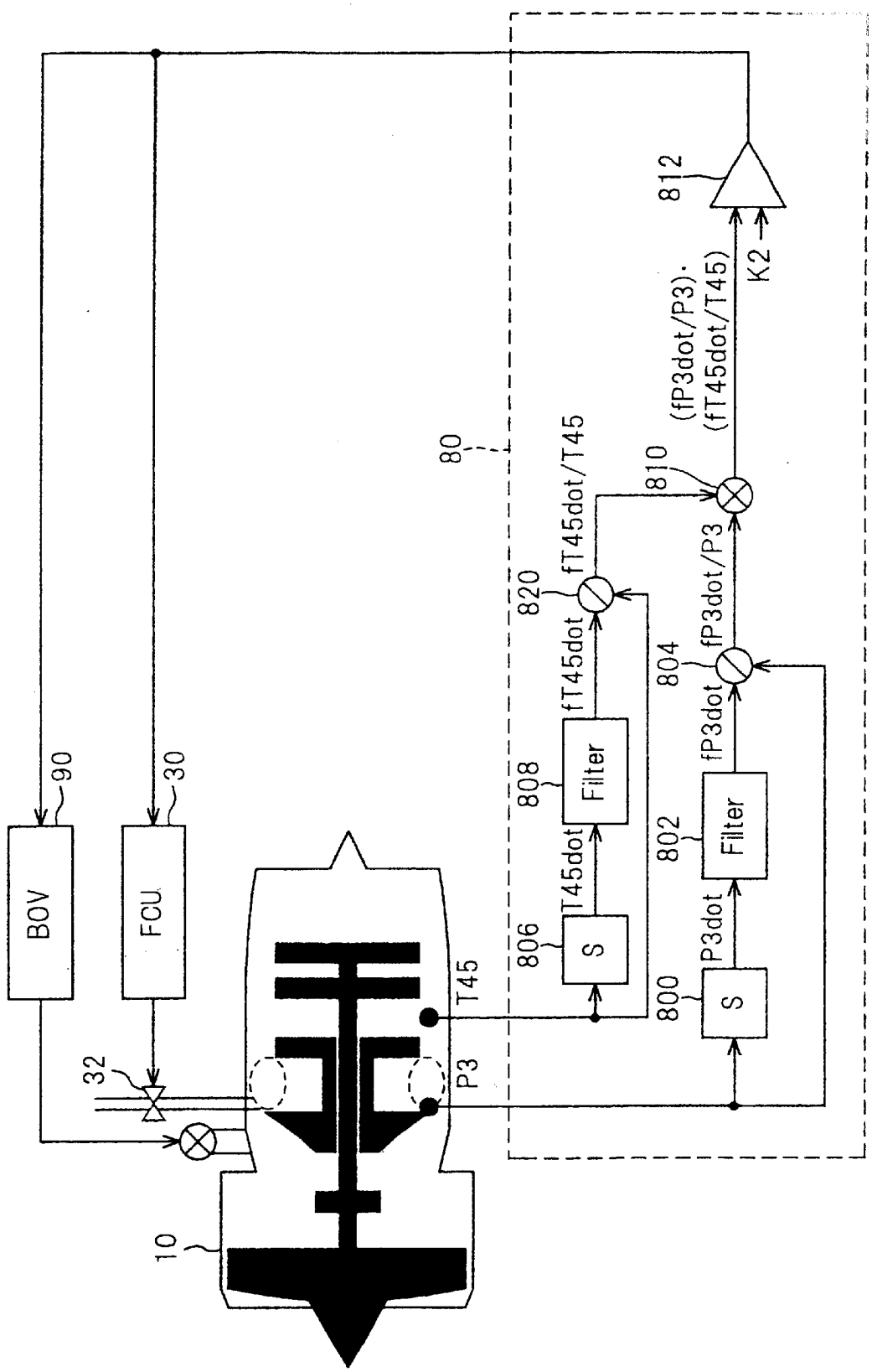
FIG. 5 is a view, similar to FIG. 2, but showing the surge detection operation of a surge detection system of a gas turbine aeroengine according to a second embodiment of the invention.

FIG. 5 is a view, similar to FIG. 2, but showing the surge detection operation of a surge detection system of a gas turbine aeroengine according to a second embodiment of the invention.

Explaining this with emphasis on the differences from the first embodiment, the low-pressure turbine temperature T45 is inputted to the derivative calculation block 806 at a cycle (similarly 10 msec), where the low-pressure turbine temperature derivative (differential) T45dot is calculated. The calculated value T45dot is then inputted to the low-pass filter 808 where it is filtered and a high-frequency component in the input is removed.

The filtered value fT45dot is then inputted to a divider 820 where a division is made to determine the ratio fT45dot/T45dot (more generally, the (second) parameter indicative of the change of the turbine inlet temperature is calculated).

The values fP3dot/P3 and fT45dot/T45 are then input to the multiplier 810 where the product thereof, i.e. (fP3dot/P3)×(fT45dot/T45) which is the (third) parameter for surge detection, is calculated.

The calculated product is then inputted to the comparator 812 where the input ((fP3dot/P3)×(fT45dot/T45) is compared with a predetermined threshold value K2 (more precisely, 0.134). When the input is less than the threshold value K2, the comparator 812 outputs a signal indicating that a surge has occurred at the high-pressure compressor 24. The rest of the configuration is the same as the first embodiment.

Figure 6A:
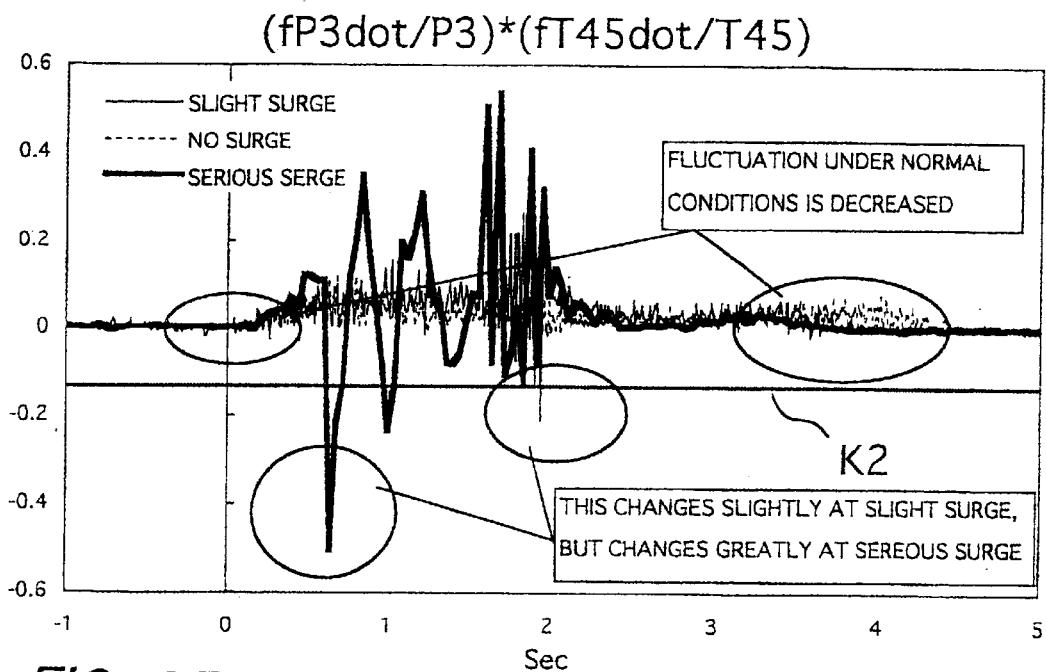
FIGS. 6A and 6B are a set of simulation test data illustrating the results of surge detection operation of the configuration illustrated in FIG. 5.
Figure 6B:
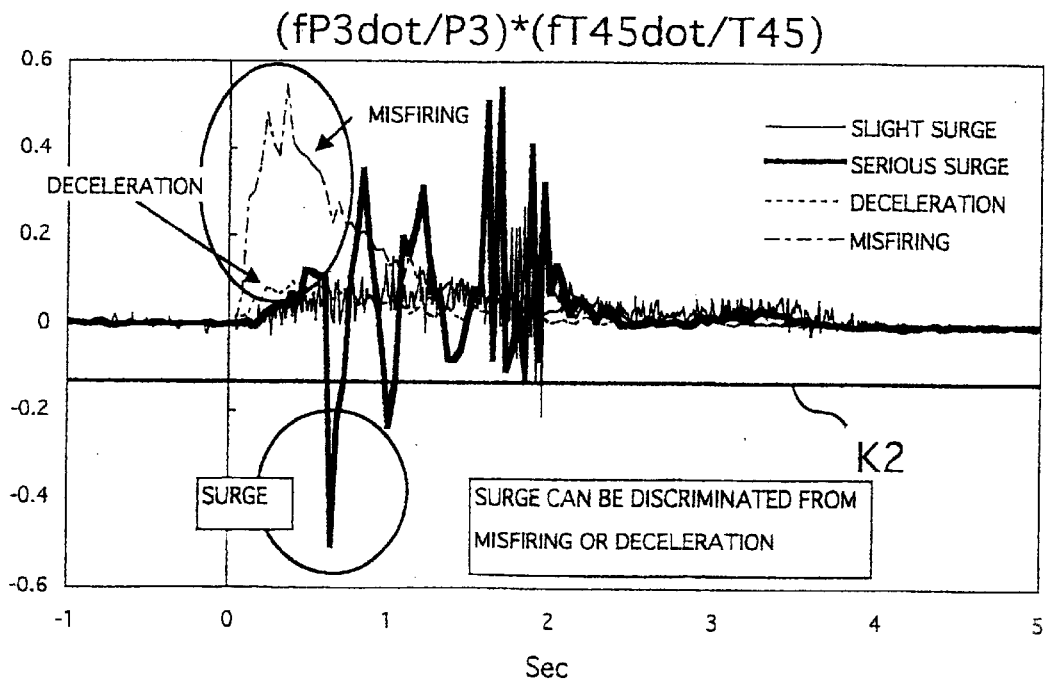
Figure 7A:
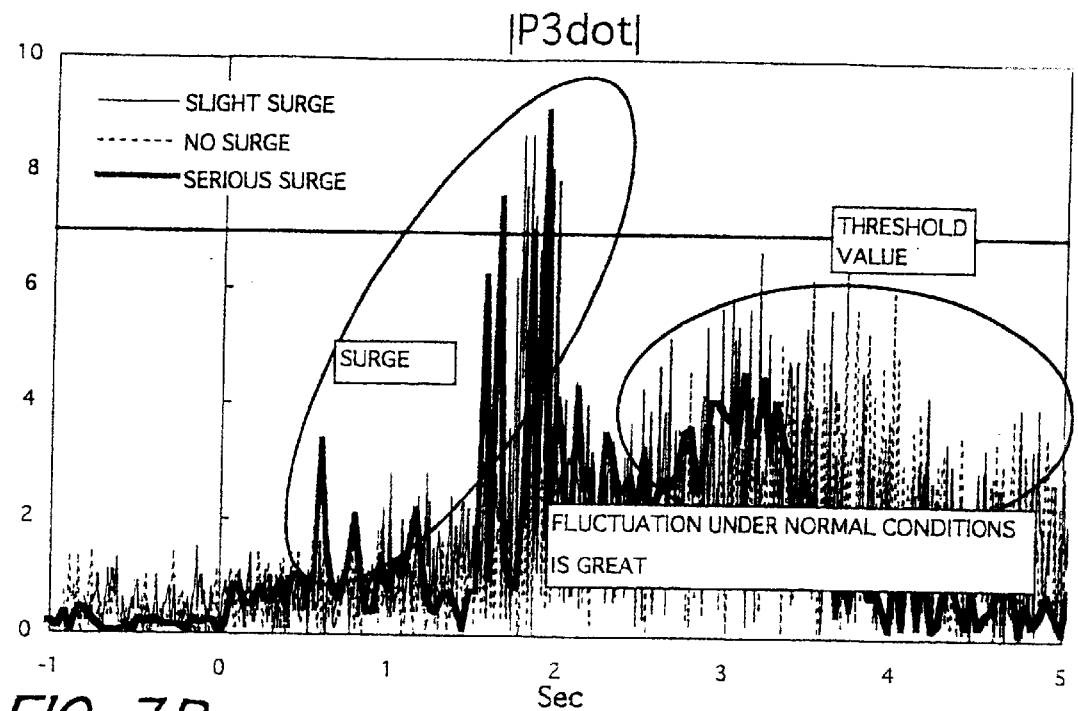
FIGS. 7A and 7B are a set of simulation test data illustrating the results of surge detection operation of a first prior art technique.
Figure 7B:
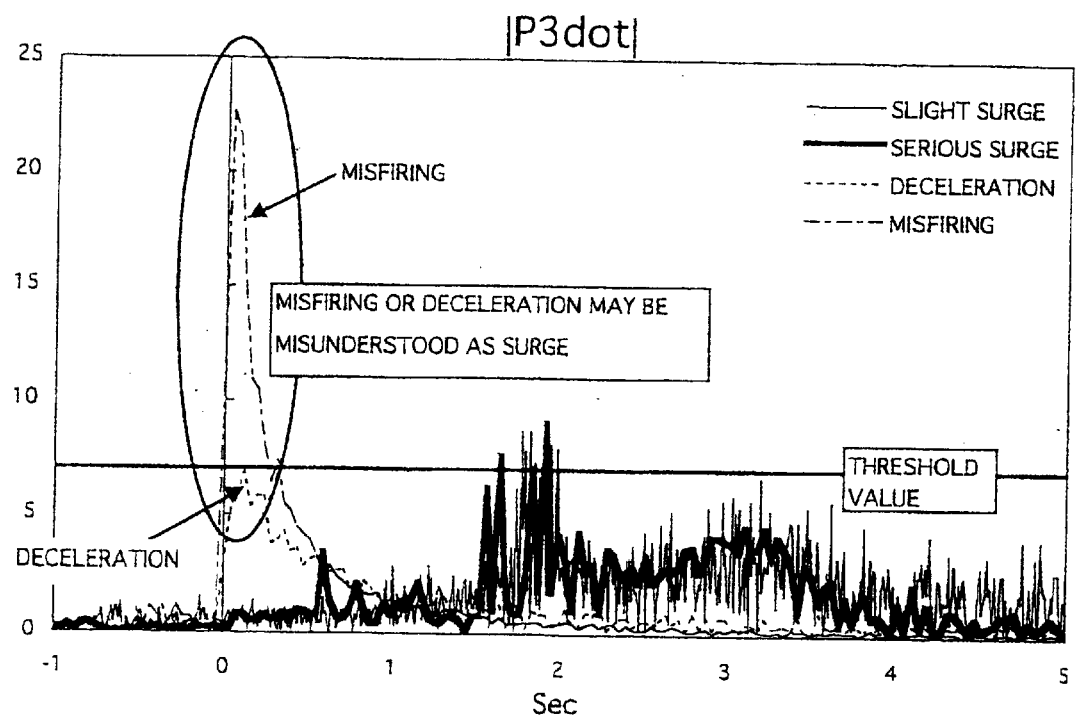
Figure 8A:
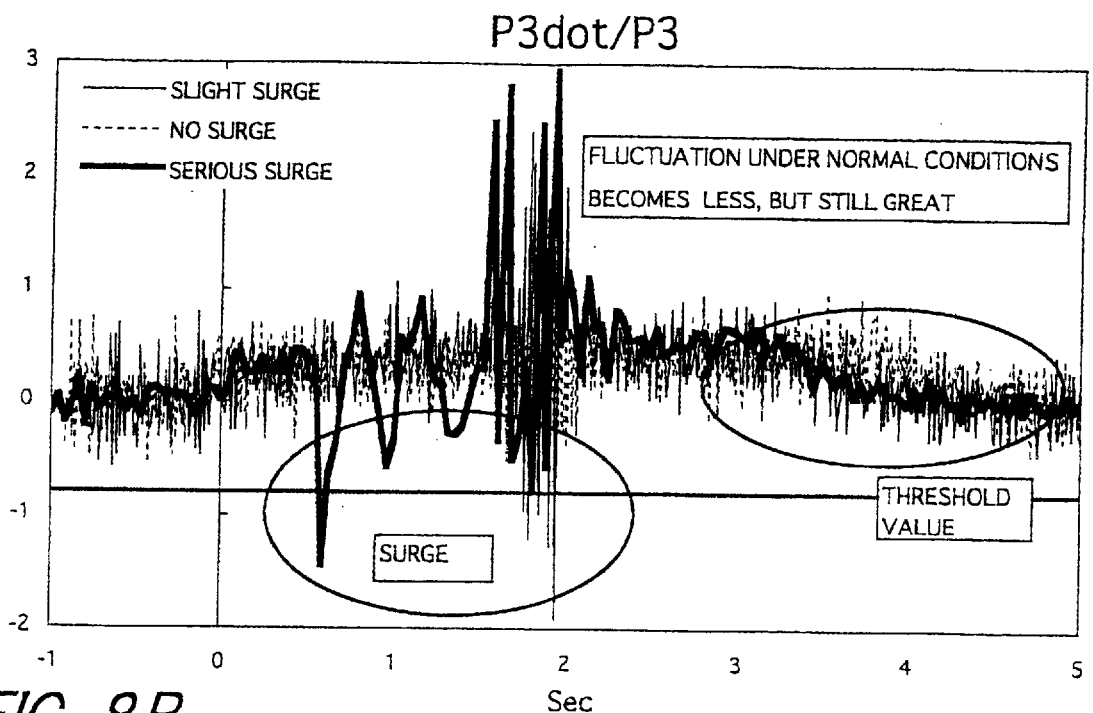
FIGS. 8A and 8B are a set of simulation test data similarly illustrating the results of surge detection operation of a second prior art technique.
Figure 8B:
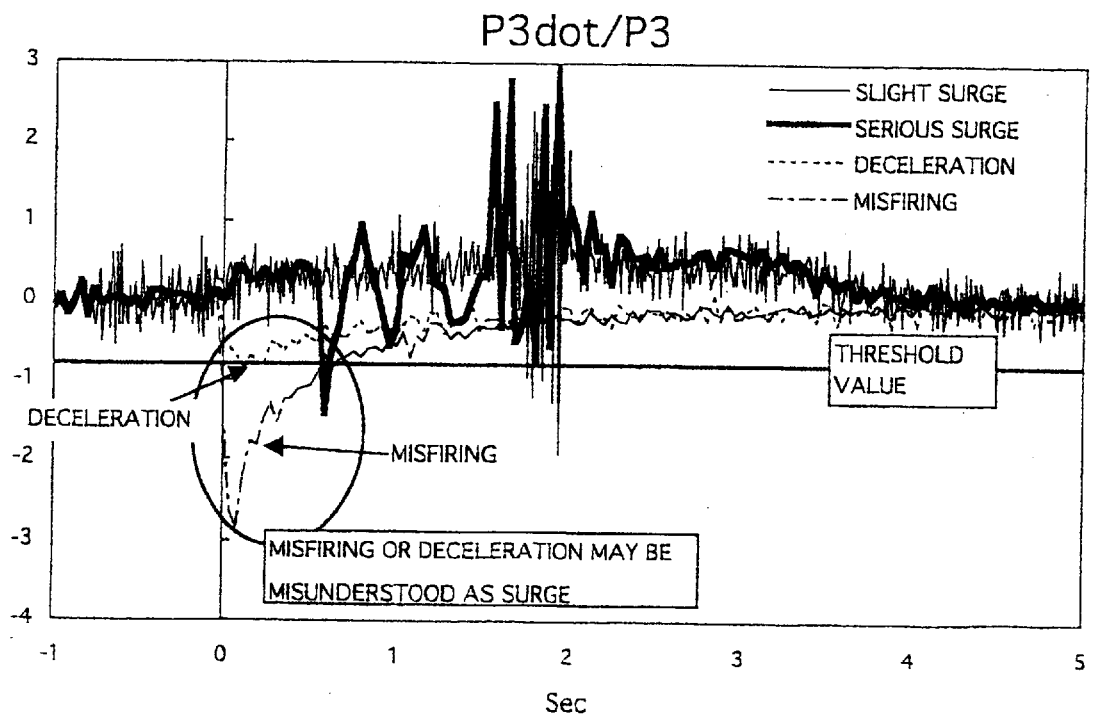
Figure 9A:
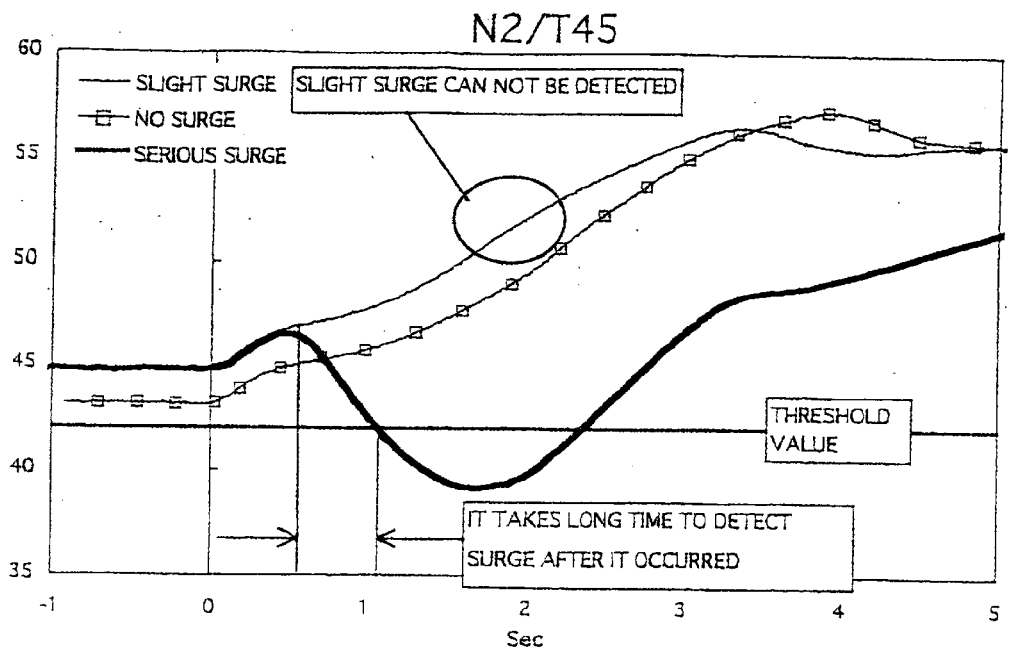
FIGS. 9A and 9B are a set of simulation test data similarly illustrating the results of surge detection operation of a third prior art technique.
Figure 9B:
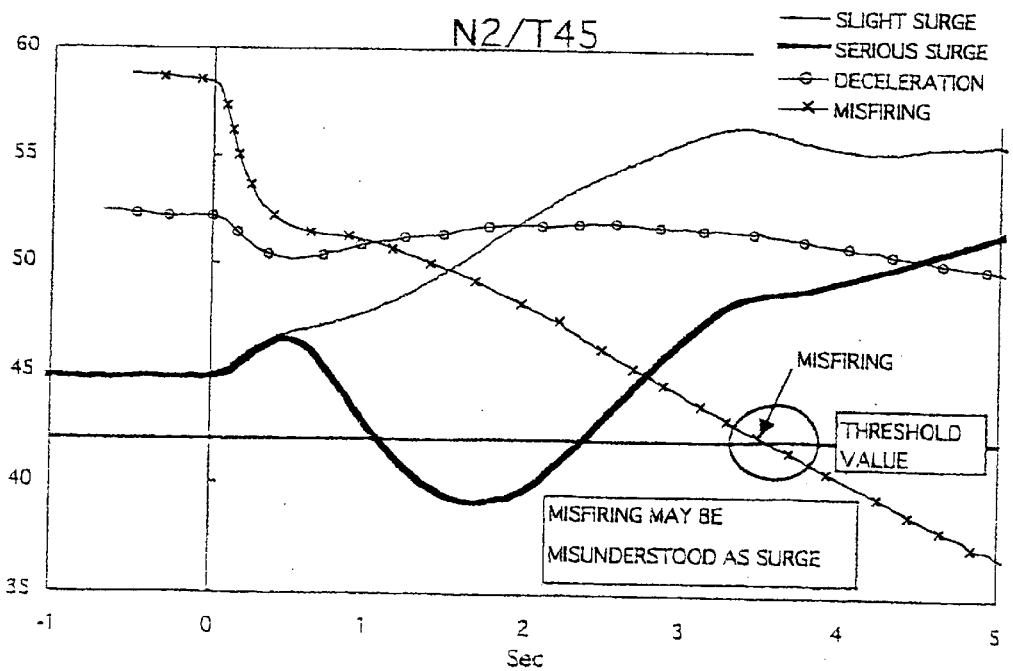
Figure 10A:
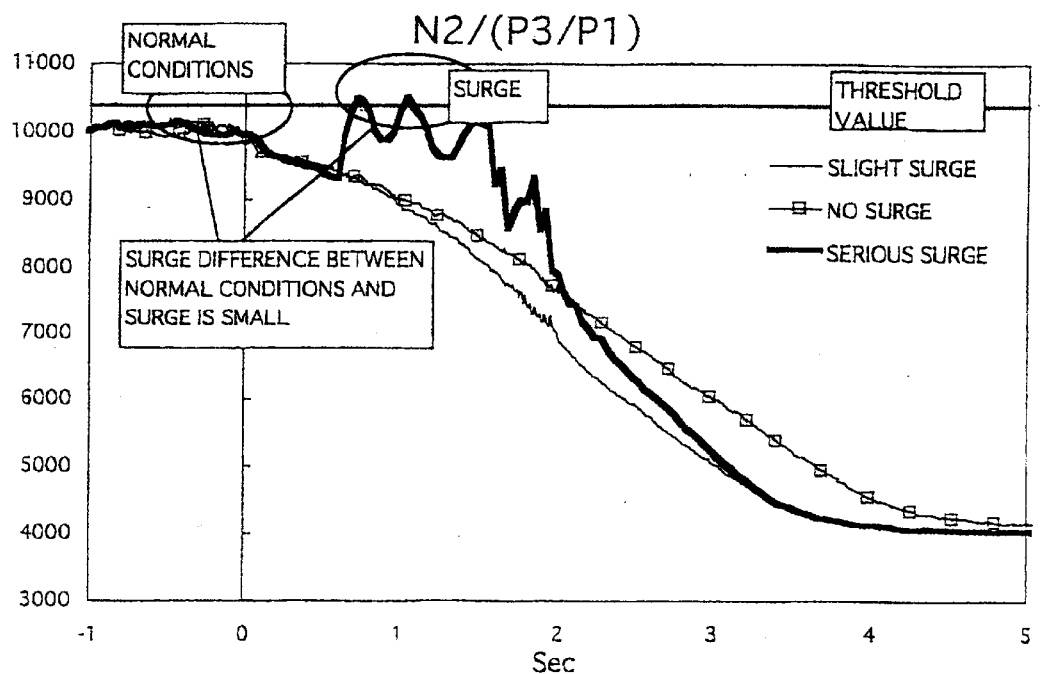
FIGS. 10A and 10B are a set of simulation test data similarly illustrating the results of surge detection operation of a fourth prior art technique.
Figure 10B:
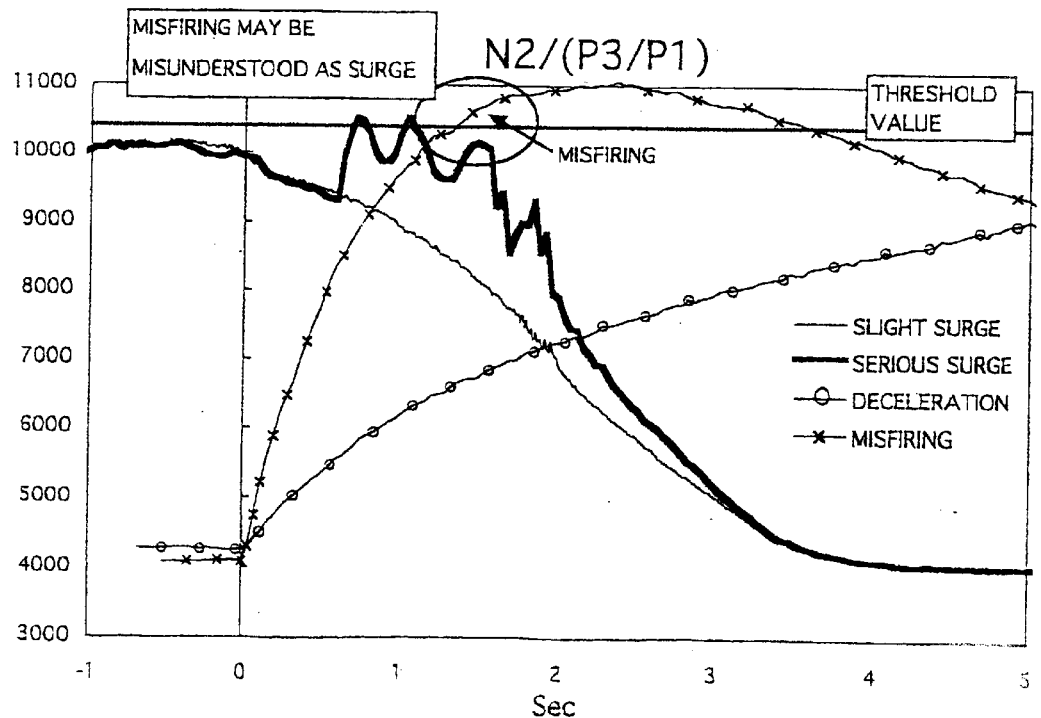

FIGS. 6A and 6B are a set of simulation test data illustrating the results of surge detection operation of the configuration illustrated in FIG. 5.

It will be understood from FIGS. 6A and 6B that the system according to the second embodiment can also achieve the same detection accuracy as the first embodiment.

The first and second embodiments are configured to have a system for detecting a surge occurred at a compressor (low-pressure compressor 16, high-pressure turbine 24, more specifically, high-pressure compressor 24) of a gas turbine aeroengine 10 having a turbine (low-pressure turbine 42 and high-pressure turbine 40) connected to the compressor, having: compressor outlet pressure detecting means (P2 sensor 74, ECU 80) for detecting an outlet pressure of the compressor (P3); turbine inlet temperature detecting means (T45 sensor 76, ECU 80) for detecting an inlet temperature of the turbine (T45); and surge detecting means (ECU 80) for detecting a surge occurred at the compressor based on at least the detected compressor outlet pressure and the turbine inlet temperature. In the system, the characteristic feature is that the system includes compressor outlet pressure change parameter determining means (ECU 80, derivative calculation block 800, low-pass filter 802, divider 804) for determining a first parameter indicative of change of the compressor outlet pressure (fP3dot/P3) based on at least the detected compressor outlet pressure (P3); turbine inlet temperature change parameter determining means (ECU 80, derivative calculation block 806, low-pass filter 808, divider 820) for determining a second parameter indicative of change of the turbine inlet temperature (fT45dot; fT45dot/T45) based on at least the detected turbine inlet temperature (T45); surge detection parameter determining means (ECU 80, multiplier 810) for determining a third parameter for surge detection ((fP3dot/P3)× ff45dot; (fP3dot/P3)×(fT45dot/T45) based on the determined first and second parameters; and parameter comparing means (ECU 80, comparator 812) for comparing the third parameter with a threshold value (K, K2); and the surge detecting means (ECU 80) detects the surge occurred at the compressor based on a result of the comparison In the system, the surge detection parameter determining means calculates a product of the first and second parameters (fP3dot/P3; fT45dot, fT45dot/T45), and determines the product as the third parameter.

In the system, the compressor outlet pressure change parameter determining means calculates a ratio between the detected compressor outlet pressure (P3) and change thereof with respect to time (P3dot), and determines the ratio as the first parameter.

In the system, the compressor outlet pressure change parameter determining means calculates a differential of the detected compressor outlet pressure (P3dot), and determines the differential as the change of the detected compressor outlet pressure with respect to time.

In the system, the turbine inlet temperature change parameter determining means calculates at least one of change of the detected turbine inlet temperature with respect to time (T45dot) and a ratio (fT45dot/T45) between the detected turbine inlet temperature (T45) and the change thereof with respect time (T45dot), and determines the calculated value as the second parameter.

In the system, the turbine inlet temperature change parameter calculates a differential of the detected turbine inlet temperature (T45dot) and determines the differential as the change of the detected turbine inlet pressure with respect to time.

In the system, the surge detecting means determines that the surge occurred at the compressor when the third parameter is less than the threshold value (K, K2).

The system further includes: corrective control means (ECU 80) for conducting a corrective control when the surge is detected the corrective control means conducts a fuel metering control such that fuel to the aeroengine is decreased, or the corrective control means conducts a bleed-off control such that air is bled from the compressor to drop the pressure in the compressor.

It should be noted in the above that, although the foregoing embodiments are explained with regard to a turbofan engine as an example of a gas turbine aeroengine, the gas turbine aeroengine can instead be a turbojet engine, a turboprop engine, a turboshaft engine or the like.

The entire disclosure of Japanese Patent Application No. 2000-154444 filed on May 25, 2000, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for detecting a surge which occurred at a compressor of a gas turbine aeroengine having a turbine connected to the compressor, comprising:
   compressor outlet pressure detecting means for detecting an outlet pressure of the compressor;
   turbine inlet temperature detecting means for detecting an inlet temperature of the turbine;
   compressor outlet pressure change parameter determining means for determining a first parameter indicative of change of the compressor outlet pressure based on at least the detected compressor outlet pressure;
   turbine inlet temperature change parameter determining means for determining a second parameter indicative of change of the turbine inlet temperature based on at least the detected turbine inlet temperature;
   surge detection parameter determining means for determining a third parameter for surge detection based on the determined first and second parameters;
   parameter comparing means for comparing the third parameter with a threshold value; and
   surge detecting means for detecting the surge which occurred at the compressor based on a result of the comparison.

2. A system according to claim 1, wherein the surge detection parameter determining means calculates a product of the first and second parameters, and determines the product as the third parameter.

3. A system according to claim 1, wherein the compressor outlet pressure change parameter determining means calculates a ratio between the detected compressor outlet pressure and change thereof with respect to time, and determines the ratio as the first parameter.

4. A system according to claim 3, wherein the compressor outlet pressure change parameter determining means calculates a differential of the detected compressor outlet pressure, and determines the differential as the change of the detected compressor outlet pressure with respect to time.

5. A system according to claim 1, wherein the turbine inlet temperature change parameter determining means calculates at least one of change of the detected turbine inlet temperature with respect to time and a ratio between the detected turbine inlet temperature and the change thereof with respect time, and determines the calculated value as the second parameter.

6. A system according to claim 5, wherein the turbine inlet temperature change parameter calculates a differential of the detected turbine inlet temperature and determines the differential as the change of the detected turbine inlet pressure with respect to time.

7. A system according to claim 1, wherein the surge detecting means determines that the surge occurred at the compressor when the third parameter is less than the threshold value.

8. A system according to claim 1, further including:
   corrective control means for conducting a corrective control when the surge is detected.

9. A system according to claim 8, wherein the corrective control means conducts a fuel metering control such that fuel to the aeroengine is decreased.

10. A system according to claim 8, wherein the corrective control means conducts a bleed-off control such that air is bled from the compressor to drop the pressure in the compressor.

11. A method of detecting a surge which occurred at a compressor of a gas turbine aeroengine having a turbine connected to the compressor, comprising the steps of:

(a) detecting an outlet pressure of the compressor;

(b) detecting an inlet temperature of the turbine;

(c) determining a first parameter indicative of change of the compressor outlet pressure based on at least the detected compressor outlet pressure;

(d) determining a second parameter indicative of change of the turbine inlet temperature based on at least the detected turbine inlet temperature;

(e) determining a third parameter for surge detection based on the determined first and second parameters;

(f) comparing the third parameter with a threshold value; and (g) detecting the surge which occurred at the compressor based on a result of the comparison.

12. A method according to claim 11, wherein the step (e) calculates a product of the first and second parameters, and determines the product as the third parameter.

13. A method according to claim 11, wherein the step (c) calculates a ratio between the detected compressor outlet pressure and change thereof with respect to time, and determines the ratio as the first parameter.

14. A method according to claim 13, wherein the step (c) calculates a differential of the detected compressor outlet pressure, and determines the differential as the change of the detected compressor outlet pressure with respect to time.

15. A method according to claim 11, wherein the step (d) calculates at least one of change of the detected turbine inlet temperature with respect to time and a ratio between the detected turbine inlet temperature and the change thereof with respect time, and determines the calculated value as the second parameter.

16. A method according to claim 15, wherein the step (d) calculates a differential of the detected turbine inlet temperature and determines the differential as the change of the detected turbine inlet pressure with respect to time.

17. A method according to claim 11, wherein the step (g) determines that the surge occurred at the compressor when the third parameter is less than the threshold value.

18. A method according to claim 11, further including the step of:

(h) conducting a corrective control when the surge is detected.

19. A method according to claim 18, wherein the step (h) conducts a fuel metering control such that fuel to the aeroengine is decreased.

20. A method according to claim 18, wherein the step (h) conducts a bleed-off control such that air is bled from the compressor to drop the pressure in the compressor.

* * * * *